United States Patent
Keyse et al.

(10) Patent No.: US 7,079,932 B2
(45) Date of Patent: Jul. 18, 2006

(54) METHOD FOR TIE-UP DETECTION IN AN AUTOMATIC TRANSMISSION

(75) Inventors: Brian Keyse, Farmington Hills, MI (US); Stephen Cicala, Dearborn Heights, MI (US); Ihab Soliman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 470 days.

(21) Appl. No.: 10/605,822

(22) Filed: Oct. 29, 2003

(65) Prior Publication Data

US 2005/0096819 A1   May 5, 2005

(51) Int. Cl.
G06F 17/00 (2006.01)
G06F 19/00 (2006.01)

(52) U.S. Cl. .............................. 701/51; 701/62; 701/66; 477/80

(58) Field of Classification Search ................. 701/51, 701/55, 56, 60, 62, 66, 67; 73/118.1, 488; 477/78, 79, 80; 192/3.51–3.59
See application file for complete search history.

(56) References Cited

U.S. PATENT DOCUMENTS

| | | | | |
|---|---|---|---|---|
| 5,931,885 A * | 8/1999 | Kubo et al. | .................... | 701/51 |
| 6,106,435 A * | 8/2000 | Endo et al. | ................. | 477/148 |
| 6,264,580 B1 * | 7/2001 | Tabata et al. | ............... | 477/149 |
| 6,264,581 B1 * | 7/2001 | Tashiro et al. | .............. | 477/154 |
| 6,435,049 B1 * | 8/2002 | Janasek et al. | ............... | 74/335 |
| 6,961,646 B1 * | 11/2005 | Soliman et al. | ............... | 701/51 |
| 6,976,388 B1 * | 12/2005 | Heap et al. | ................ | 73/118.1 |

* cited by examiner

*Primary Examiner*—Richard M. Camby
(74) *Attorney, Agent, or Firm*—David B. Kelley; Brooks & Kushman

(57) ABSTRACT

A method for detecting tie-up in an automatic transmission is provided. The rate of change of the output shaft acceleration is calculated by twice differentiating with respect to time the transmission output shaft speed. The calculated rate is then compared to a predetermined value, and each time the acceleration rate drops below the predetermined value, a controller stores the event in memory. If the acceleration rate drops below the predetermined value too frequently, a flag is set and indication of the transmission tie-up is prevented. When a predetermined amount of time passes, during which the acceleration rate does not drop below the predetermined value, the flag is cleared and indication of a tie-up is allowed. When the acceleration rate drops below the predetermined value, and the transmission is in a shift cycle and tie-up prevention flags are cleared, a transmission tie-up is indicated.

22 Claims, 3 Drawing Sheets

METHOD FOR TIE-UP DETECTION IN AN AUTOMATIC TRANSMISSION

BACKGROUND OF INVENTION

1. Field of the Invention

The present invention relates to a method for detecting tie-ups in an automatic transmission for a vehicle.

2. Background Art

Vehicles today increasingly employ the use of adaptive learning systems to improve a wide variety of vehicle operations. For example, various engine characteristics may be monitored such that actual outputs are compared to desired outputs, so that adjustments can be made to bring the two closer together. Such engine characteristics may include those that affect performance, fuel efficiency, or some other characteristic to be controlled. Other systems within a vehicle may be similarly monitored, with adjustments being made to bring the actual system outputs closer to the desired system output. Again, such outputs may affect performance or efficiency, or may be directly related to occupant comfort.

An example of the latter is found in a vehicle transmission, which not only affects vehicle performance and efficiency, but also has a direct impact on the quality of the ride. This is particularly noticeable during times when the transmission is shifting gears. A smooth transition between gears may be largely imperceptible to vehicle occupants; conversely, a rough transition between gears can contribute to occupant discomfort, and therefore, has a negative effect on the quality of the ride. One reason a transmission may not shift smoothly, is because tie-ups can occur. When a transmission shifts smoothly from one gear to the next, bands or clutches are engaged on the new gear just as the bands or clutches are disengaged on the previous gear. If, however, there is even a slight error in the timing between the engagement and disengagement of the respective bands or clutches, both gears may be held simultaneously. This phenomenon is known as a tie-up.

One device for determining when a tie-up occurs is described in U.S. Pat. No. 6,106,435 issued to Endo et al. on Aug. 22, 2000. The Endo et al. device decides whether a transmission tie-up has occurred, and in particular, decides the degree of tie-up. The degree of tie-up is determined from an equation that requires integration of the difference between instantaneous and average transmission output shaft acceleration. Alternatively, the Endo et al. device may determine the degree of tie-up based on the maximum amplitude of the fluctuation of the transmission output shaft speed. Endo et al. also briefly mentions prohibiting the calculation of the degree of tie-up in the case of a "bad road surface".

One limitation of Endo et al. is that the parameters used to determine the degree of tie-up involve the integral of an acceleration term—i.e., a speed term—which may not be as sensitive to output shaft changes as an acceleration term, or the derivative of an acceleration term. Thus, as time derivatives of the speed of the transmission output shaft are taken, the resulting parameters are increasingly sensitive to transmission output shaft changes. In addition, although there may be many ways to determine whether a road surface is "bad", Endo et al. does not describe a specific device or method for determining a bad road surface.

Therefore, a need still exists for a method to detect transmission tie-ups which utilizes a sensitive parameter, such as the time based derivative of a transmission shaft acceleration, and also provides a specific method to determine a false tie-up, such as might be indicated on a bad road surface.

SUMMARY OF INVENTION

Accordingly, the invention provides a method for detecting a tie-up in an automatic transmission having at least an input shaft and an output shaft. The method includes determining a rate of change of acceleration of a transmission shaft. The rate of change of acceleration of the transmission shaft is compared to a predetermined value.

When the rate of change of acceleration of the transmission shaft is below the predetermined value, a tie-up is indicated.

The invention also provides a method for detecting tie-up in an automatic transmission having at least an input shaft and an output shaft. The method includes monitoring a speed of a transmission shaft for some period of time. A parameter related to the transmission shaft speed is calculated. The parameter has a plurality of time dependent values. At least some of the parameter values are compared to a predetermined value, and it is determined each time the at least some parameter values change from being at or above the predetermined value to being below the predetermined value. Indication of a tie-up is temporarily prevented when the at least some parameter values change from being at or above the predetermined value to being below the predetermined value with a frequency that equals or exceeds a predetermined frequency. A tie-up is indicated when the at least some parameter values change from being at or above the predetermined value to being below the predetermined value and indication of a tie-up is not prevented.

The invention further provides a vehicle having a drive line including a transmission with at least an input shaft and an output shaft the vehicle includes a controller in communication with the transmission. The controller is configured to monitor a speed of a transmission shaft for some period of time. The controller is further configured to calculate a parameter related to the transmission shaft speed. The parameter has a plurality of time dependent values. The controller compares at least some of the parameter values to a predetermined value, and determines each time the at least some parameter values change from being at or above the predetermined value to being below the predetermined value. The controller temporarily prevents indication of a tie-up when the at least some parameter values change from being at or above the predetermined value to being below the predetermined value with a frequency that equals or exceeds a predetermined frequency. The controller is further configured to indicate a tie-up when the at least some parameter values change from being at or above the predetermined value to being below the predetermined value and indication of a tie-up is not prevented.

DETAILED DESCRIPTION

Figure 1:
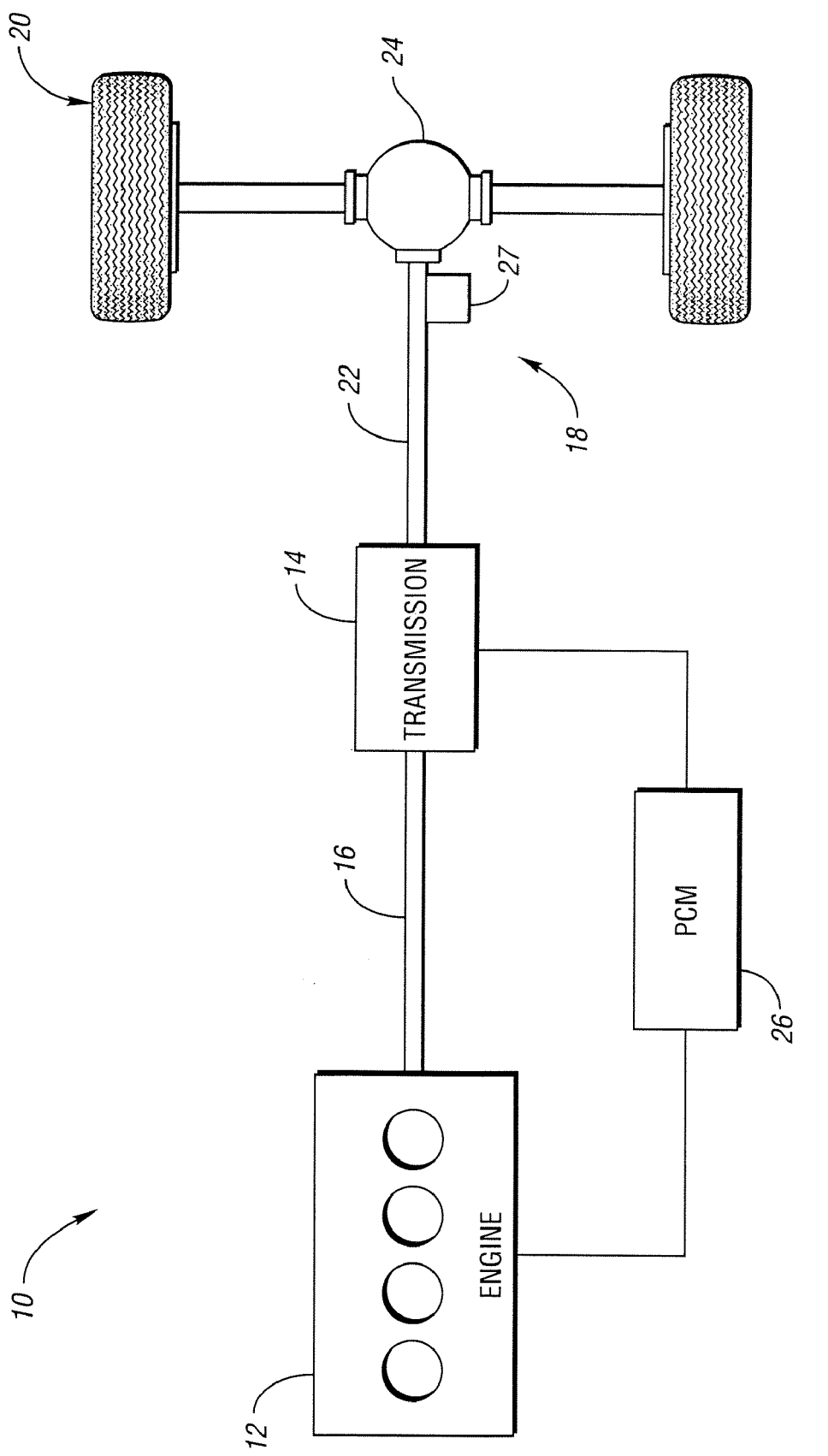
FIG. 1 is a schematic representation of a portion of a vehicle in accordance with the present invention.

FIG. 1 shows a simple schematic of a portion of a vehicle 10 in accordance with the present invention. The vehicle 10 includes an engine 12, which is connected to a transmission 14 via a transmission input shaft 16. A vehicle drive line 18 transfers power from the transmission 14 to the vehicle wheels 20. The drive line 18 includes a transmission output shaft 22, and a differential 24. Although the transmission 14 is shown with only an input shaft 16 and an output shaft 22, a transmission, such as the transmission 14, may include one or more intermediate shafts disposed between the input and output shafts. Connected to the engine 12 and the transmission 14 is a controller, or powertrain control module (PCM) 26. As explained more fully below, the PCM 26 contains preprogrammed algorithms which implement a method for detecting tie-up in the transmission 14.

The PCM 26 is shown in FIG. 1 directly connected to the engine 12 and the transmission 14. Alternatively, the engine 12 and the transmission 14 may have separate controllers, for example, an engine control module (ECM) and a transmission control module (TCM), which communicate directly with each other. A vehicle system controller (VSC) could also be used to communicate with a TCM and an ECM, for example, on a controller area network (CAN). Similarly, a controller, such as the PCM 26, can be used in vehicles having different configurations from the one illustrated in FIG. 1. For example, the present invention can be used with alternative vehicle forms, such as hybrid electric vehicles (HEV), fuel cell vehicles, or hybrid fuel cell vehicles, just to name a few.

The PCM 26 is configured to monitor the speed of the transmission output shaft 22, which is measured by a speed sensor 27. Alternatively, the PCM 26 could be configured to monitor the speed of the input shaft 16, or an intermediate shaft, if the transmission is so configured. The PCM 26 can be configured to continuously monitor the transmission output shaft speed any time the vehicle 10 is running. Alternatively, it can be configured to monitor the transmission output shaft speed at selected intervals, or only monitor the speed when it is above zero. As seen in the flowchart 28, shown in FIG. 2, monitoring the speed of the transmission output shaft begins the implementation of a tie-up detection method in accordance with the present invention, see step 30.

Next, the PCM 26 uses the transmission output shaft speed to calculate values of a certain parameter, see step 32. The calculated parameter is related to the transmission output shaft speed, and because that value may vary over time, the parameter values are also time dependent. One parameter related to the transmission output shaft speed that may be particularly useful for detecting transmission tie-ups, is the rate of change of the acceleration of the transmission output shaft speed. This parameter can be determined by twice differentiating with respect to time the transmission output shaft speed. Because of the double differentiation, the calculated parameter may be more sensitive than the output shaft speed to operational changes in the transmission. Of course, other parameters can be used; however, the rate of change of acceleration of the transmission output shaft is a parameter that is easily calculated from a readily available measurement.

In step 34, the rate of change of the acceleration of the transmission output shaft (referred to hereafter as acceleration rate) is compared to a predetermined acceleration rate value. This step is performed since it is well known that during a transmission tie-up, the speed of the transmission output shaft, and thus the rate of acceleration, is affected. In particular, the acceleration and the acceleration rate, of the transmission output shaft, will decrease during a transmission tie-up. Therefore, the predetermined value of the acceleration rate is set to a value that is indicative of a transmission tie-up.

The predetermined acceleration rate value can be set in a number of different ways. For example, a tie-up in the transmission could be induced, and the acceleration rate calculated throughout the induced tie-up. This would provide an indication of an acceleration rate value that could be expected during an actual transmission tie-up. Alternatively, the frequency of the drive line 18 could be calculated, and the predetermined value of the acceleration rate could be set based on that frequency.

At step 36, it is determined whether a first predetermined amount of time has passed since the acceleration rate has previously dropped below the predetermined value. If it has, and a flag was previously set—for example, at step 46 below—it is cleared, and indication of a transmission tie-up is not prevented, see step 38. After step 38, or if the first predetermined amount of time has not passed since the last time the acceleration rate dropped below the predetermine value, then step 40 is performed.

Figure 2:
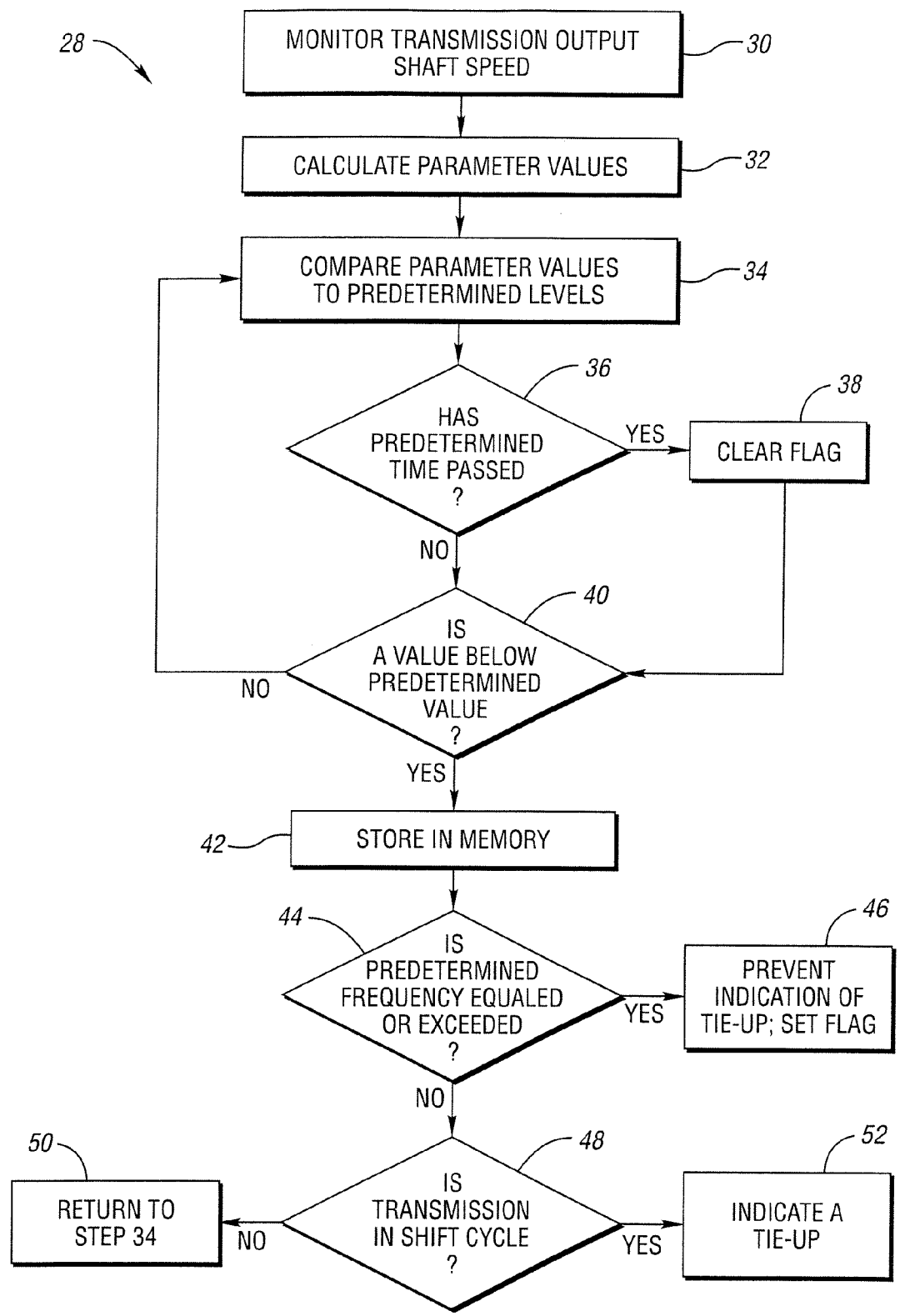
FIG. 2 is a flowchart illustrating a method in accordance with the present invention.

It is worth noting here, that although the method illustrated in the flow chart 28 in FIG. 2 is shown as a series of sequential steps, some steps may be performed in a different order, or even simultaneously. For example, steps 34 and 36 check parameter values and time, respectively, on an ongoing basis. Therefore, these steps may often occur simultaneously. Moreover, the steps of the method will be repeated throughout operation of the vehicle. This means that a flag that is set in step 46 when the method is performed one time, can be cleared in step 38 when the method is performed a subsequent time.

When the PCM 26 compares the calculated values of the acceleration rate to the predetermined value, it determines whether any of the values of the acceleration rate fall below the predetermined value, see step 40. Specifically, the PCM 26 determines each time the acceleration rate changes from being at or above the predetermined value, to being below the predetermined value. This is graphically illustrated, and explained more fully below, in conjunction with FIG. 3. If the values of the calculated acceleration rate are not below the predetermined value, the method indicates a return to step 34, where the newly calculated values of the acceleration rate are again compared to the predetermined value.

When a calculated value of the acceleration rate drops below the predetermined value, this event is stored by the PCM 26 for later use, see step 42. The PCM 26 could be programmed to indicate a tie-up at this step; however, the present invention includes a method for determining whether the drop in acceleration rate is caused by something other than a tie-up. For example, when a vehicle travels on a bumpy road, the uneven road surface may cause changes in the speed of the transmission output shaft. These changes will be reflected in the calculated acceleration rate. Thus, it is possible for bumps in the road to cause the acceleration rate to drop below the predetermined value. To help counter the possibility of erroneously indicating a transmission tie-up, the PCM 26 performs a number of additional steps.

In step 44, it is determined whether a predetermined frequency has been equaled or exceeded. Specifically, the PCM 26 examines the number of times the acceleration rate has dropped below the predetermined value, and when these events occurred. Thus, the PCM 26 is able to determine with what frequency the acceleration rate is dropping below the predetermined value. The PCM 26 then compares the actual frequency with a predetermined frequency, to see if the acceleration rate has dropped below the predetermined value too often within a set period of time. If the predetermined frequency is equaled or exceeded, this may indicate that the vehicle is being driven on a bumpy road; therefore, a flag is set, preventing indication of a transmission tie-up, see step 46.

The predetermined frequency can be set in any one of a number of different ways. For example, the predetermined frequency could be set based on the calculated acceleration rate falling below the predetermined value x-times in y-minutes. Alternatively, the predetermined frequency could be based on the number of times the acceleration rate drops below the predetermined value before a first predetermined amount of time has passed. In such a case, the PCM 26 counts the number of times the acceleration rate drops below the predetermined value. If the first predetermined time passes and the acceleration rate does not drop below the predetermined value in this time, the PCM 26 resets the count to zero and starts again. Thus, when the acceleration rate drops below the predetermined value frequently in a short period of time, it may be indicative of driving on a bumpy road, and indication of a transmission tie-up is prevented.

If the predetermined frequency has not been equaled or exceeded, an additional step is performed to further ensure that the change in acceleration rate is actually due to a transmission tie-up. In step 48, the PCM 26 determines whether the transmission 14 is in a shift cycle. Since a transmission tie-up typically occurs while torque is being transferred from one set of gears to another, the PCM 26 will not indicate a tie-up unless it determines that the transmission 14 is in a shift cycle. If it is not in a shift cycle, the PCM returns to step 34 where additional acceleration rate values are compared to the predetermined value, see step 50. If, however, the previous criteria are met, and the PCM 26 determines that the transmission 14 is a shift cycle, a tie-up is indicated, see step 52. Information relating to a known tie-up can be used for a number of purposes, including use in an adaptive control system.

Figure 3:
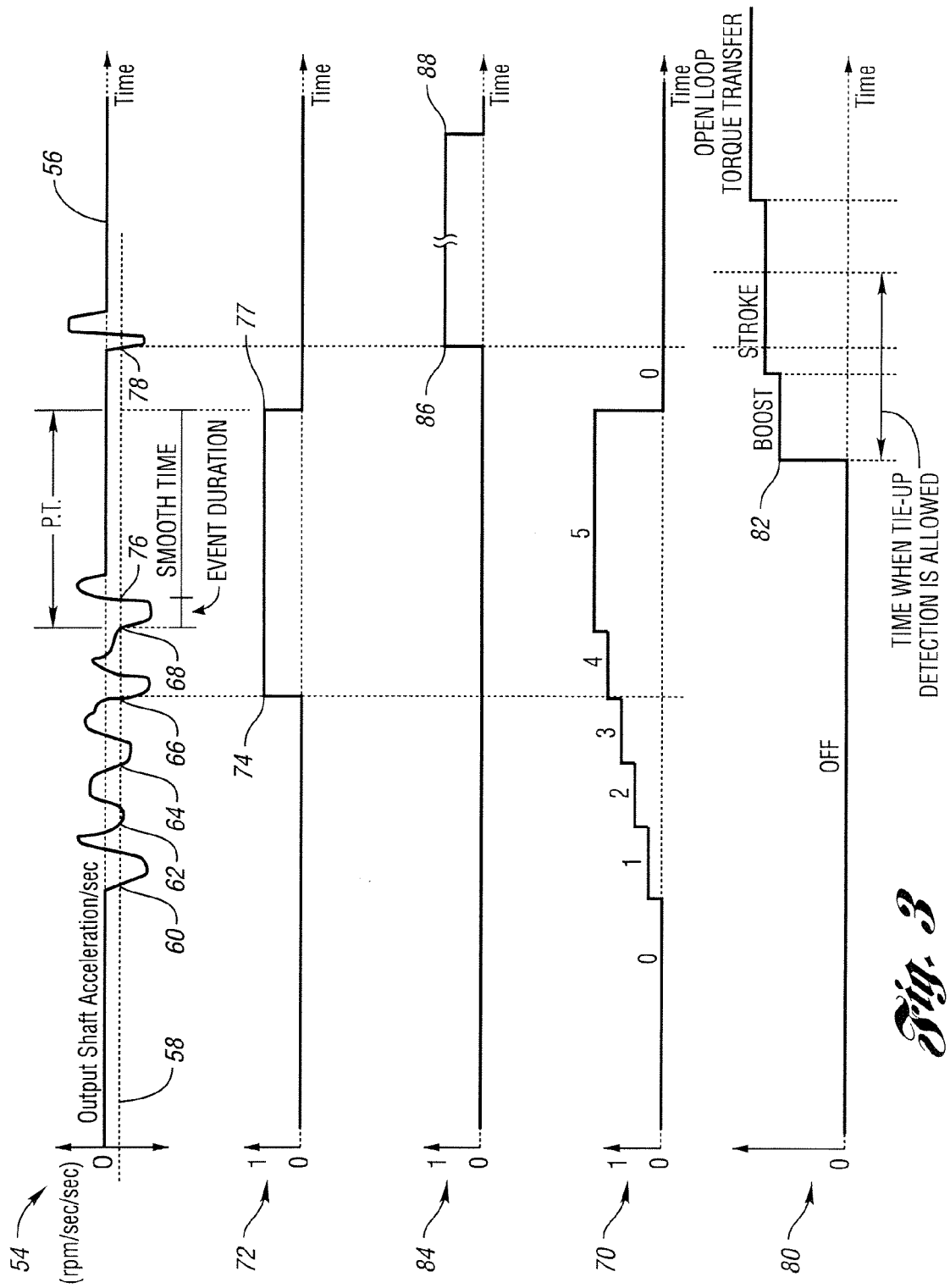
FIG. 3 is a series of graphs illustrating the method shown in the flow chart in FIG. 2.

FIG. 3 graphically illustrates the method described in FIG. 2. For example, graph 54 shows a curve 56 of the acceleration rate of a transmission output shaft over some period of time. Thus, the acceleration rate values calculated from the transmission output shaft speed are plotted as a continuous curve. A dashed line 58 represents the predetermined value to which the calculated acceleration rate is compared. As shown in step 40 in FIG. 2, a controller, such as the PCM 26, determines each time the calculated acceleration rate drops below the predetermined value. On graph 54, these points occur at 60, 62, 64, 66 and 68. The PCM 26 stores each of these events in a memory, and then determines the frequency with which they occur, see steps 42, 44.

Graph 70 looks at each of the events 60, 62, 64, 66, 68 as the beginning of a discrete occurrence, labeled 1–5, respectively. The predetermined frequency, used in step 44 in FIG. 2, is set at four. That is, at point 66, or the beginning of occurrence number four on graph 70, the predetermined frequency has been equaled. This causes a flag to be set preventing indication of a tie-up, see step 46 in FIG. 2. The point at which this occurs is graphically illustrated on Graph 72 at point 74. Of course, the predetermined frequency can be set to any desired value, with four being used here for illustrative purposes.

During actual operation of a vehicle, the phenomenon shown by points 60, 62, 64, 66 and 68 on graph 54 may be caused by the vehicle traveling over a bumpy road. Each time a vehicle encounters a bump in the road, the speed of the transmission output shaft may undergo a measurable change. As discussed above, the acceleration rate—i.e., the second time derivative of the output shaft speed—is even more sensitive to road surface disparities than the output shaft speed. Therefore, it is important that actual transmission tie-ups can be distinguished from other events or occurrences which may cause a similar response in the acceleration rate curve.

At point 74, the flag preventing indication of a tie-up is set, and it remains set until a predetermined amount of time has passed, see step 36 in FIG. 2. On graph 54, the predetermined time (P.T.) is shown starting at point 68. The predetermined time actually begins to run each time the acceleration rate drops below the predetermined value; however, it is reset each time the acceleration rate goes above the predetermined value and then drops below it again.

As seen on graph 54, the predetermined time is made up of first and second time segments. The first time segment is based on the amount of time the acceleration rate remains below the predetermined value. This may be referred to as the event duration. When the events are caused by the vehicle traveling over a bumpy road, the first time segment may be called a bump duration. The second time segment begins at point 76, when the increasing acceleration rate reaches the predetermined value—i.e., when the event duration has ended. The second time segment ends after a second predetermined amount of time, which may be referred to as "smooth time". The smooth time is some predetermined amount of time during which the acceleration rate does not fall below the predetermined value. After the first predetermined time has passed, the flag preventing indication of a tie-up is cleared, see step 38 in FIG. 2 and point 77 in FIG. 3.

On graph 54, there is one additional time when the acceleration rate drops below the predetermined value, see point 78. Because the flag preventing indication of a tie-up has been cleared, the event indicated at point 78 may be an actual transmission tie-up; however, a tie-up is not indicated until another check is complete. In particular, the PCM 26 determines whether the transmission 14 is in a shift cycle. This is indicated on graph 80 in FIG. 3. Throughout most of the time the acceleration rate of the transmission output shaft is calculated, the transmission 14 is not in a shift cycle; this is indicated by the word "off".

At point 82, the transmission 14 begins a shift cycle, which includes a number of shift phases. Shown on graph 80 are a boost phase, a stroke phase, and an open loop torque transfer phase. A complete shift cycle may include other phases as well. The phases represent different portions of a transmission control algorithm programmed into the PCM 26. Each of the phases also relates to some physical occurrence within the transmission 14. Because an actual transmission tie-up is most likely to occur in the boost phase or in the beginning of the stroke phase, indication of a tie-up is limited to these two portions of a shift cycle.

As seen on graphs 54 and 80 in FIG. 3, point 78 occurs in the beginning of the stroke phase of a shift cycle. Therefore, because the predetermined time has passed, and because the acceleration rate dropped below the predetermined value in the beginning of the stroke phase, a tie-up is indicated. This is shown on graph 84 at point 86. When a tie-up is indicated, such as at point 86, the PCM 26 sets a tie-up flag which remains on until a third predetermined amount of time has passed, as indicated by point 88 on graph

84. At point 88, which is at the end of a shift cycle, the PCM 26 clears the tie-up flag, and monitoring of the acceleration rate of the transmission output shaft continues.

While the best mode for carrying out the invention has been described in detail, those familiar with the art to which this invention relates will recognize various alternative designs and embodiments for practicing the invention as defined by the following claims.

The invention claimed is:

1. A method for detecting a tie-up in an automatic transmission having at least an input shaft and an output shaft, the method comprising:
   determining a rate of change of acceleration of a transmission shaft;
   comparing the rate of change of acceleration of the transmission shaft to a predetermined value; and
   indicating a tie-up when the rate of change of acceleration of the transmission shaft is below the predetermined value.

2. The method of claim 1, wherein determining the rate of change of acceleration of the transmission shaft includes determining a speed of the transmission shaft and twice differentiating the determined speed with respect to time.

3. The method of claim 1, further comprising:
   inducing a tie-up in the transmission;
   determining the rate of change of acceleration of the transmission shaft throughout the induced tie-up; and
   setting the predetermined value based on the determined rate of change of acceleration of the transmission shaft throughout the induced tie-up.

4. The method of claim 1, further comprising:
   determining when the transmission is in a shift cycle; and
   preventing the indication of a tie-up unless the transmission is in a shift cycle.

5. The method of claim 4, wherein the shift cycle is divided into a plurality of shift phases, including a boost phase and a stroke phase, and wherein the indication of a tie-up is prevented unless the transmission is in a boost phase or a stroke phase.

6. A method for detecting tie-up in an automatic transmission having at least an input shaft and an output shaft, the method comprising:
   monitoring a speed of a transmission shaft for some period of time;
   calculating a parameter related to the speed of the transmission shaft, the parameter having a plurality of time dependent values;
   comparing at least some of the parameter values to a predetermined value;
   determining each time the at least some parameter values change from being at or above the predetermined value to being below the predetermined value;
   temporarily preventing indication of a tie-up when the at least some parameter values change from being at or above the predetermined value to being below the predetermined value with a frequency that equals or exceeds a predetermined frequency; and
   indicating a tie-up when the at least some parameter values change from being at or above the predetermined value to being below the predetermined value and indication of a tie-up is not prevented.

7. The method of claim 6, wherein the parameter is a rate of change of acceleration of the transmission shaft.

8. The method of claim 7, wherein calculating the parameter includes twice differentiating with respect to time the transmission shaft speed.

9. The method of claim 6, further comprising:
   inducing a tie-up in the transmission;
   calculating the parameter throughout the induced tie-up; and
   setting the predetermined value based on the parameter calculated throughout the induced tie-up.

10. The method of claim 6, further comprising:
    determining when the transmission is in a shift cycle; and
    preventing the indication of a tie-up unless the transmission is in a shift cycle.

11. The method of claim 10, wherein the shift cycle is divided into a plurality of shift phases, including a boost phase and a stroke phase, and wherein the indication of a tie-up is prevented unless the transmission is in a boost phase or a stroke phase.

12. The method of claim 6, wherein temporarily preventing indication of a tie-up includes setting a first flag, the method further comprising clearing the first flag, thereby allowing indication of a tie-up, when a first predetermined amount of time passes after the first flag is set and the at least some parameter values do not change from being at or above the predetermined value to being below the predetermined value before the first predetermined amount of time passes.

13. The method of claim 12, wherein the first predetermined amount of time includes first and second time segments, the first time segment being based on the amount of time the at least some parameter values remain below the predetermined value after the at least some parameter values change from being at or above the predetermined value to being below the predetermined value, the second time segment beginning when the at least some parameter values change from being below the predetermined value to being at or above the predetermined value, and the second time segment ending after a second predetermined amount of time.

14. A vehicle having a driveline including a transmission with at least an input shaft and an output shaft, the vehicle comprising:
    a controller in communication with the transmission and configured to
    a) monitor a speed of a transmission shaft for some period of time,
    b) calculate a parameter related to the transmission shaft speed, the parameter having a plurality of time dependent values,
    c) compare at least some of the parameter values to a predetermined value,
    d) determine each time the at least some parameter values change from being at or above the predetermined value to being below the predetermined value,
    e) temporarily prevent indication of a tie-up when the at least some parameter values change from being at or above the predetermined value to being below the predetermined value with a frequency that equals or exceeds a predetermined frequency, and
    f) indicate a tie-up when the at least some parameter values change from being at or above the predetermined value to being below the predetermined value and indication of a tie-up is not prevented.

15. The vehicle of claim 14, wherein the parameter is a rate of change of acceleration of the transmission shaft.

16. The vehicle of claim 15, wherein the controller is further configured to twice differentiate with respect to time the transmission shaft speed, thereby calculating the rate of change of acceleration of the transmission shaft.

17. The vehicle of claim 14, wherein the predetermined value is set based on behavior of the parameter during an induced tie-up.

18. The vehicle of claim 14, wherein the predetermined value is set based on a known frequency of the driveline.

19. The vehicle of claim 14, wherein the controller is further configured to determine when the transmission is in a shift cycle, and to prevent the indication of a tie-up unless the transmission is in a shift cycle.

20. The vehicle of claim 19, wherein the shift cycle is divided into a plurality of shift phases, including a boost phase and a stroke phase, and wherein the controller is further configured to prevent indication of a tie-up unless the transmission is in a boost phase or a stroke phase.

21. The vehicle of claim 14, wherein the controller temporarily prevents indication of a tie-up by setting a first flag, the controller being further configured to clear the first flag, thereby allowing indication of a tie-up, when a first predetermined amount of time passes after the first flag is set and the at least some parameter values do not change from being at or above the predetermined value to being below the predetermined value before the first predetermined amount of time passes.

22. The vehicle of claim 21, wherein the first predetermined amount of time includes first and second time segments, the first time segment being based on the amount of time the at least some parameter values remain below the predetermined value after the at least some parameter values change from being at or above the predetermined value to being below the predetermined value, the second time segment beginning when the at least some parameter values change from being below the predetermined value to being at or above the predetermined value, and the second time segment ending after a second predetermined amount of time.

* * * * *